Oct. 31, 1967  D. C. WYCOFF ET AL  3,349,873
SELF-ADJUSTING POWER OPERATED BRAKE
Filed June 13, 1966  2 Sheets-Sheet 1

Inventors:
D. C. Wycoff
M. Elez
By: James E. Niller
Attorney

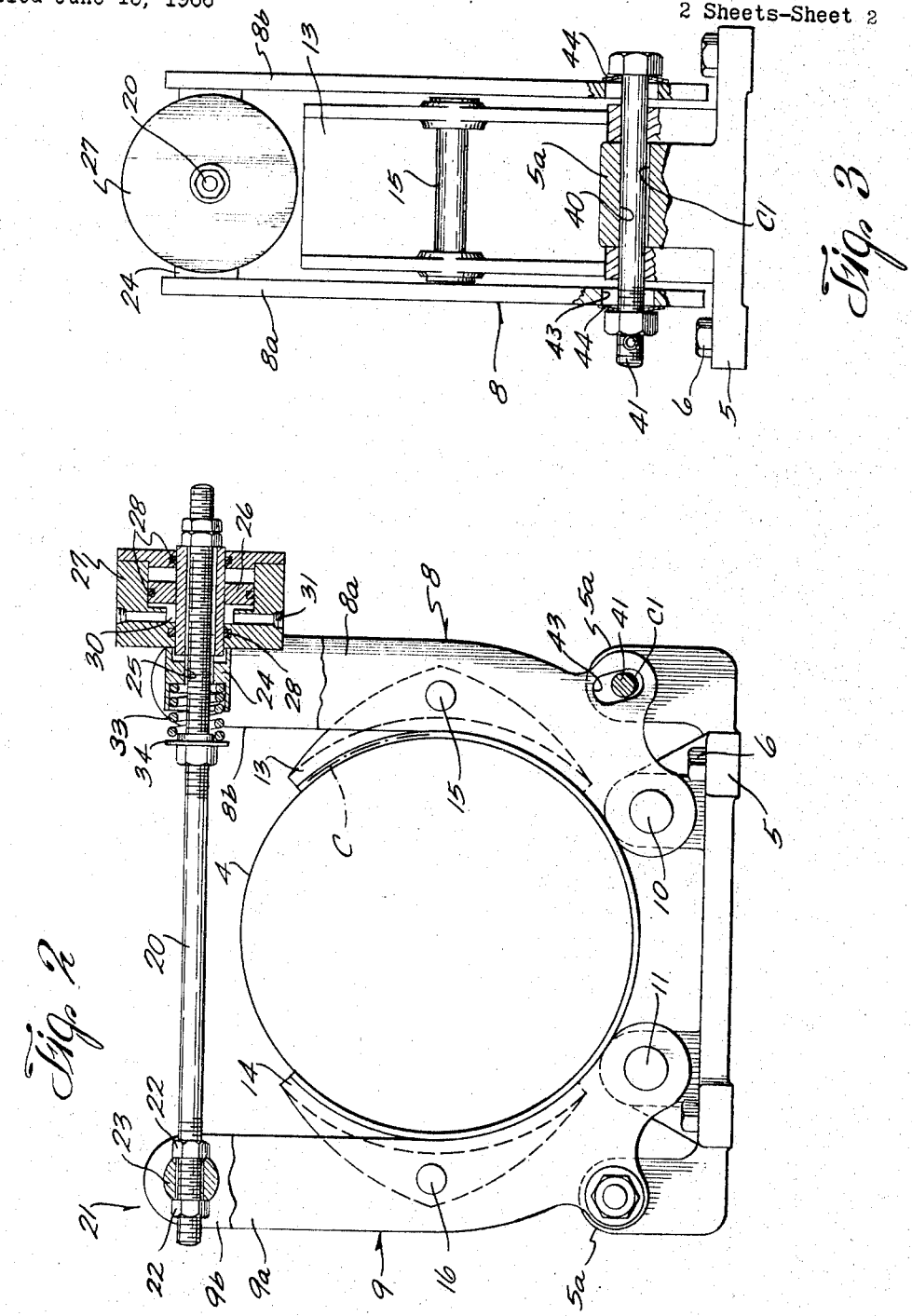

United States Patent Office 3,349,873
Patented Oct. 31, 1967

3,349,873
SELF-ADJUSTING POWER OPERATED BRAKE
David C. Wycoff, Brookfield, and Milenko Elez, Milwaukee, Wis., assignors to Harnischfeger Corporation, Milwaukee, Wis., a corporation of Wisconsin
Filed June 13, 1966, Ser. No. 557,135
3 Claims. (Cl. 188—75)

ABSTRACT OF THE DISCLOSURE

Self-adjusting brake shoes for power operated brakes in which a predetermined clearance is provided between the brake shoe arms and the base of the brake, and also having a yieldable and self-adjusting pin and slot connection between the brake arms and the base, and also having adjustable spring means between the arms and the pin for providing relative movement therebetween and whereby the amount of clearance for the brake shoes is maintained constant.

---

This invention relates to an improved self-adjusting brake shoe for a power operated brake which finds particular but not exclusive utility when used with overhead cranes and the like.

Prior art devices have heretofor utilized complicated and elaborate components to measure the stroke of the actuating mechanism and as the lining wears, the actuating means must act through a greater distance. This variation in required stroke must be compensated for from time to time. An example of the prior art which utilizes a complicated hydraulic valving arrangement for that purpose is the U.S. Patent No. 3,203,509 issued Aug. 31, 1965 to D. I. Bohn.

An object of the present invention is to provide an improved self-adjusting brake that has constant shoe clearance regardless of shoe lining wear, which requires no adjustment throughout the life of the linings, and which does not require equalization between the shoes due to uneven wear therebetween.

More specifically, the invention relates to a brake of the above type in which the constant brake shoe operating clearance is proportional to a predetermined clearance between the brake shoe arms and the frame base of the brake, and also in which the arms are resiliently held in adjusted position relative to their respective pin, which pins form the pre-set clearance with the frame base. With this arrangement and construction of the cooperating parts, the arms and their respective pin each act as a one piece unit until sufficient wear occurs and then sufficient force is applied by the power operating means to overcome the resilient connection between the arms and their respective pin to thereby permit relative adjustment between each of the arms and their pin.

The present invention is synergistic in that it automatically provides self adjustment and equalization between the shoes, regardless of unequal wear on the shoes, and does so continuously and repeated as needed.

The self-adjusting, power operated, self-equalizing brake provided by the present invention finds particular but not exclusive utility in heavy duty situations, such as are encountered in controlling travelling cranes or other heavy equipment.

These and other objects and advantages of the present invention will appear hereinafter as this disclosure progresses, reference being had to the accompanying drawings, in which:

FIGURE 2 is an enlarged, elevational view, partially in section, of the brake shown in FIGURE 1, certain parts being omitted for clarity, and FIGURE 3 is an elevational, side view of the device as shown in FIGURE 2, certain parts being shown in section or broken away for clarity.

Figure 1:
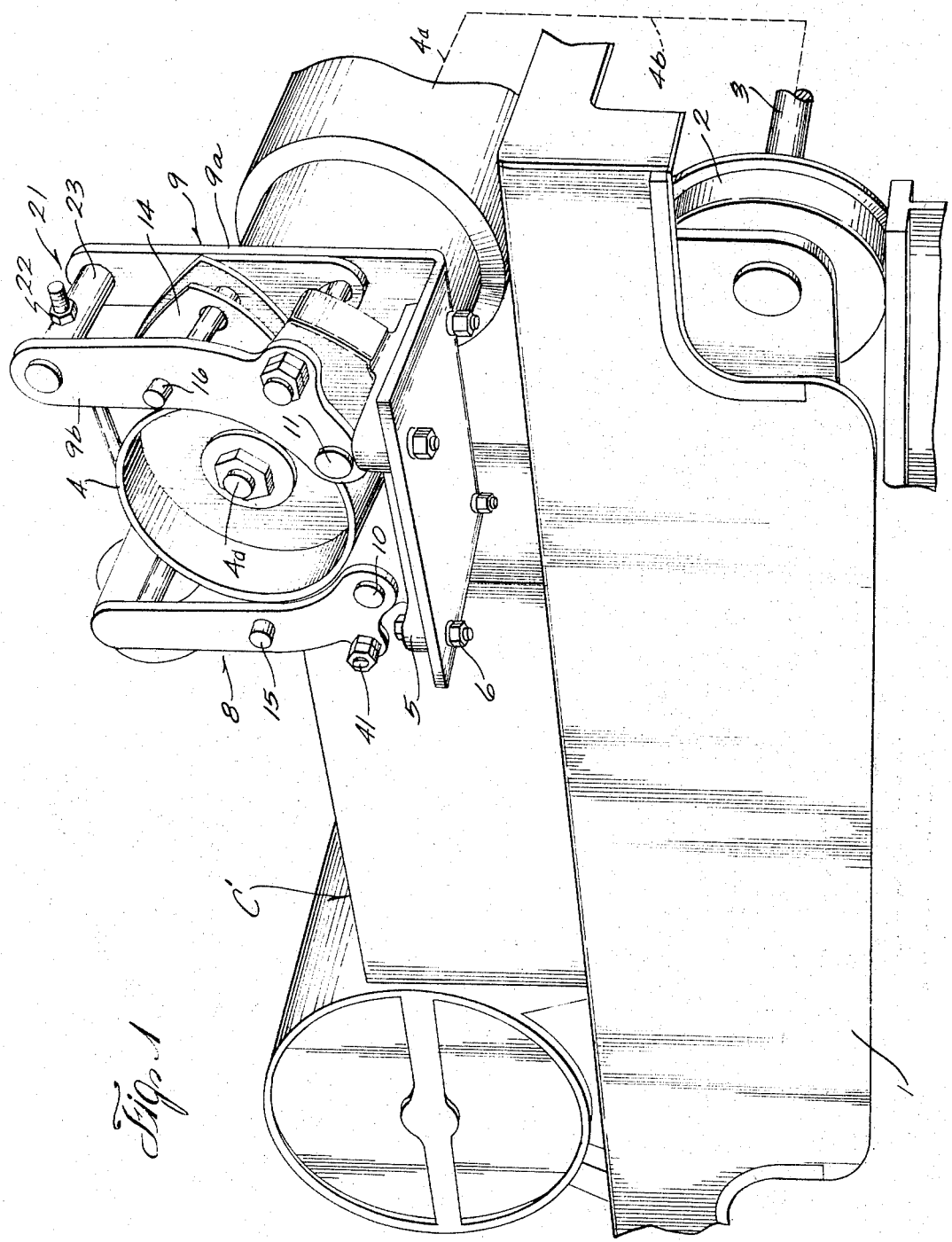
FIGURE 1 is a fragmentary, perspective view showing the present invention as embodied in an ovehhead crane.

Referring in greater detail to the drawings, a travelling crane C' includes a frame 1 having conventional wheels 2 mounted on a shaft 3 journalled in the frame. A brake wheel 4 is fixed to a shaft 4a and shafts 3 and 4a are operatively connected together through a gear train indicated schematically as 4b. Any number of brakes may be used in any one crane, and the base 5 of the brake is suitably fixed by bolt means 6 to the crane frame.

A pair of opposed brake shoe arms 8 and 9 are pivoted, respectively, on bolt means 10 and 11 on the brake base 5. Each of the arms 8 and 9 is comprised, respectively, of two elements 8a, 8b and 9a, 9b but each may be considered as a one piece arm. Each arm 8 and 9 has a brake shoe 13 and 14, respectively, pivoted by a pin 15 and 16 in the conventional manner.

The outer or free ends of the arms 8 and 9 are connected by a coupling rod 20, the connection 21 to arm 9 being fixed by nuts 22 which hold rod 20 captive in a cross brace 23 between arm elements 9a and 9b. A cross brace 24 extends rigidly between the outer ends of arm element 8a and 8b, and rod 20 extends through aperture 25 in this brace. A piston 26 is fixed to rod 20 and sealingly slides within a hydraulic cylinder 27 fixed to brace 24. Suitable fluid seals 28 are provided between the piston and cylinder and an expansible fluid chamber 30 is thus formed to which pressure fluid is admitted via port 31 for actuating the brake by causing the rod 20 to shift to the right (as viewed in FIGURE 2). This movement has the effect of pulling the arms 8 and 9 together, forcing the shoes against the brake wheel. Return spring 33 acts between brace 24 and an adjustable stop 34 which is fixed to rod 20, to urge the arms apart to thus clear the shoes of the brake wheel. This release clearance of the shoes is constant regardless of shoe wear, as will appear. This clearance for each shoe will be designated as C and is shown by the fragmentary broken line position of the shoe in FIGURE 2.

Each of the brake arms has a lost motion connection with the base including a resilient or yieldable connection. As these resilient connections for arms 8 and 9 are identical, only one will be described.

An upstanding portion 5a of the base 5 has a hole 40 extending through it and a bolt means 41 extends through hole 40 and outwardly at each side. Hole 40 is larger than the diameter of bolt means 41 by a certain amount to provide a definite clearance C1. The arm 8 has a slotted, arcuate opening 43 through which the bolt means 41 extends and over which the arm can controllably swing, as will appear, about bolt means 10 as a pivot.

A resilient and adjustable connection is provided between the bolt means 41 and the arm 8 so that normally they move together as a single unit. Under certain circumstances, however, when the shoe wears, an adjustment between the bolt means 41 and arm 8 is automatically made. This yieldable and adjustable connection is as follows.

A Belleville spring 44 is provided between the head of the bolt and arm element 8b and also between arm element 8a and the nut of the bolt. The degree of compression of these Belleville springs can be varied by adjusting the nut on the bolt means. Due to the action of the Belleville spring means, the arm 8 oscillates together with the bolt means 41 as a unit and this oscillation is normally only the amount of the clearance C1 between the bolt means and the hole 40 in the base portion 5a. Thus the amount of brake shoe clearance C is always proportional to the clearance C1. In the embodiment shown, if the distance between the pivot point formed by bolt means 10 and the bolt means 41 is about one-half that of the distance between the center of the brake shoe and bolt means 10, the amount of clearance C1 is approximately one-half that of the clearance C desired for the brake shoe.

The holding capacity of the Belleville spring means is greater than the strength of the return spring 33, and thus the latter in acting to release the brake does not influence the setting of the Belleville spring means, and therefore the shoes can only open a distance as determined by the clearance C1.

As the brake shoe lining wears, the arm 8 is automatically adjusted relative to the bolt means 41 because the action of the power operating means (the hydraulic cylinder means 27) is sufficient to overcome the yieldable holding action of the Belleville spring means and thereby permit the compensating adjustment between the arm 8 and the bolt means 41.

Thus the clearance is automatically self-adjusting during operation and furthermore, each of the arms 8 and 9 are equalized as to their holding ability on the brake wheel.

By means of the present invention, constant shoe clearance, regardless of shoe lining wear, is provided and the brake requires no adjustment throughout the life of the linings. Neither does it require equalization between the arms themselves.

Various modes of carrying out the invention are contemplated as being within the scope of the following claims particularly pointing out and distinctly claiming the subject matter which is regarded as the invention:

1. A self-adjusting, power operated brake for a rotary member to be braked, comprising, a brake base, a pair of opposed brake arms pivotally mounted to the base, a brake shoe pivotally mounted on each of said arms and swingable between brake engaging and disengaging positions when said arms are swung about their pivot points on said base, power means connecting said arms together for forceably urging them towards one another and into a brake engaging position, a lost motion connection between each of said arms and said base, said connection including a yieldable and self-adjusting pin and slot connection between each of the arms and said base, said connection including a slot in each arm and a pin extending through said slots, adjustable spring means between said arms and said pin for providing relative movement therebetween, said base having a hole through which said pin freely extends with predetermined clearance, whereby said arms normally swing through said pre-determined clearance in respect to the base, and whereby said power means between said arms is effective to cause adjustment of said yieldable connection between said arms and pin upon wear of said brake shoes.

2. The combination set forth in claim 1 further characterized in that said power means includes hydraulic cylinder means for urging said arms toward one another, and a release spring acting to urge the arms apart to a brake released position.

3. The brake as set forth in claim 1 further characterized in that said adjustable spring means includes a Belleville spring.

References Cited
UNITED STATES PATENTS
| | | | |
|---|---|---|---|
| 2,364,664 | 12/1944 | Schnell | 188—79.5 |
| 2,976,958 | 3/1961 | Scholl | 188—196 X |

FOREIGN PATENTS
| | | |
|---|---|---|
| 118,425 | 10/1942 | Australia. |
| 454,625 | 1/1928 | Germany. |
| 842,394 | 6/1952 | Germany. |

DUANE A. REGER, *Primary Examiner.*